United States Patent [19]

Kullik et al.

[11] 4,399,585

[45] Aug. 23, 1983

[54] VACUUM CLEANER WITH CONSTANT AIR FLOW

[75] Inventors: Günter R. J. Kullik, Meinerzhagen; Werner Dürr, Leonberg; Robert Maier, Nufringen, all of Fed. Rep. of Germany

[73] Assignee: Progress-Elektrogeräte Mauz & Pfeiffer GmbH & Co., Stuttgart, Fed. Rep. of Germany

[21] Appl. No.: 291,102

[22] Filed: Sep. 7, 1981

[30] Foreign Application Priority Data

Aug. 8, 1980 [DE] Fed. Rep. of Germany ....... 3030059

[51] Int. Cl.³ .......................... G05D 7/06; A47L 5/22; H02P 7/28
[52] U.S. Cl. ...................................... 15/319; 318/644
[58] Field of Search .................... 15/319, 339; 318/644

[56] References Cited

FOREIGN PATENT DOCUMENTS 2032476 1/1972 Fed. Rep. of Germany ........ 15/319

*Primary Examiner*—Chris K. Moore
*Attorney, Agent, or Firm*—Becker & Becker, Inc.

[57] ABSTRACT

A vacuum cleaner with constant air flow for household and industrial purposes. The vacuum cleaner includes a suction fan driven by an electric motor. An air flow measuring device is arranged in the working air flow of the suction fan, and has an electrical output signal proportional to the air flow. This electrical output signal is conveyed to a regulating and control circuit which adjusts the working air flow to a predetermined value as a function of the output signal.

14 Claims, 1 Drawing Figure

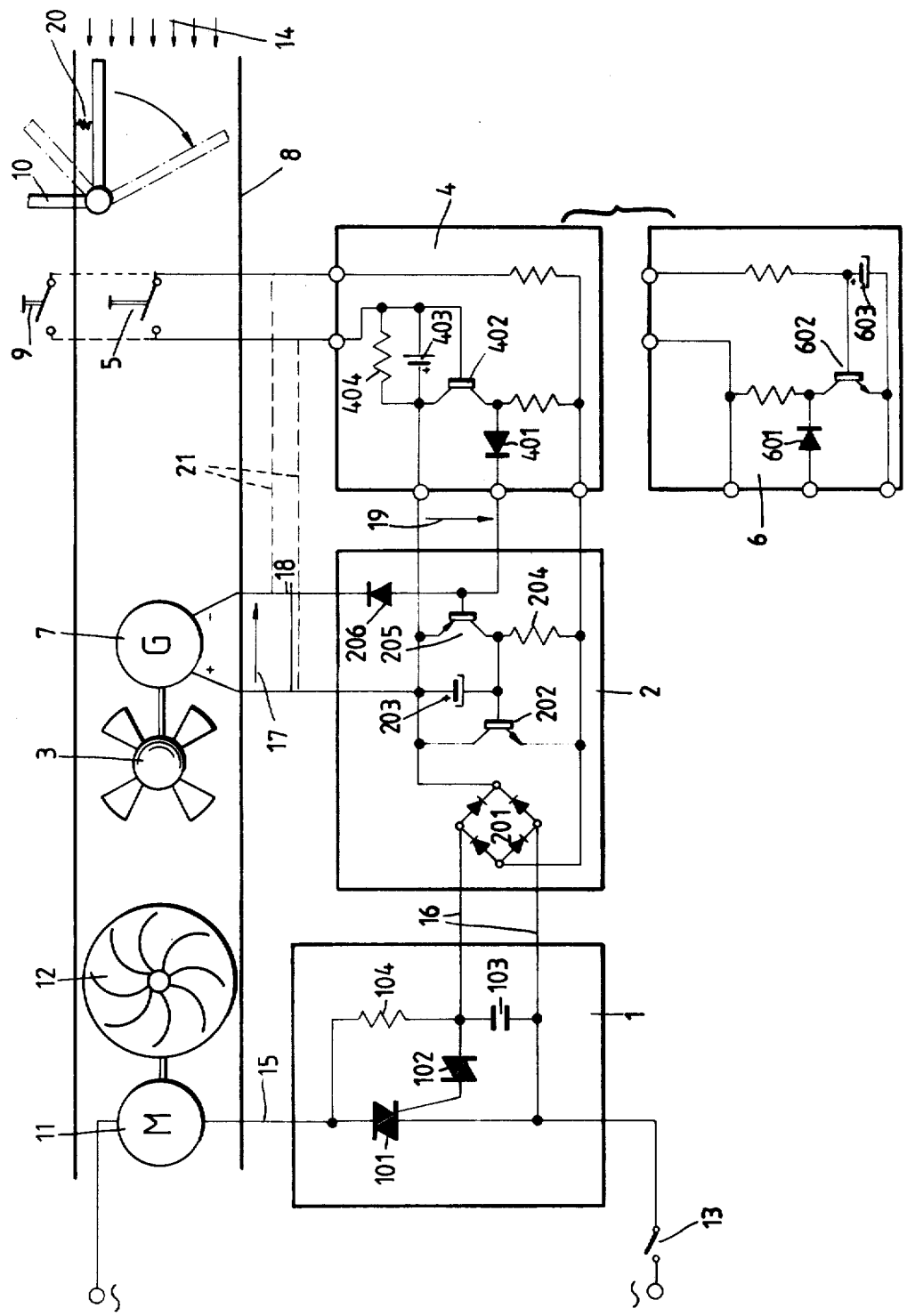

VACUUM CLEANER WITH CONSTANT AIR FLOW

The present invention relates to a vacuum cleaner with constant air flow for household and industrial purposes, and includes a suction fan driven by an electric motor, with an air flow measuring device being arranged in the working air flow of the suction fan and having an electrical output signal proportional to the air flow.

With known vacuum cleaners of this type, the working air flow is conveyed to the device through a cleaning tool with appropriate connection devices such as a suction tube or suction hose; the working air flow is discharged through discharge openings into the surrounding air. The working air flow, i.e. the suction air flow, which enters at high speed in the region of the cleaning tool, carries along the dirt and dust particles located in this region. In the course of the flow path, for example in the interior of the device, the dirt and dust particles are filtered out and collected by a dust-collecting container embodied as a dust filter.

The cleaning effect of such a device is determined by the high air inflow speed in the region of the cleaning tool. Closely connected or related to the conveyed air volume is the surface covering usable as the suctioning-in cross section, which is taken into consideration through the formation of the suctioning nozzles and the suctioning channels thereof. The suction capacity of the vacuum cleaner, i.e. the air volume conveyed by the suction fan, must be such that a sufficiently high air speed is still attained while covering as large a surface as possible of the surface to be cleaned in all suction ranges of the cleaning tool.

Different suction powers are required by a vacuum cleaner depending upon the articles to be cleaned. Thus, for example, to clean textile floor coverings, a very high suction power is required, and for cleaning light textiles, such as for example curtains, a small nominal suction power is required. If for example a curtain is cleaned with a suction power which is too great, the curtain, because it hangs loose, can be sucked into the suction opening of the cleaning tool and can thus be damaged.

Heretofore known vacuum cleaners have manual, mechanical, or electrical adjustment devices which make it possible to reduce the suction air flow to adapt to the articles to be cleaned. Consequently there occurs, for example, a mechanical change of the suction air flow by means of a manually actuatable shift element, which exposes a by-pass air opening in the course of the suction path. A part of the working air flow passes through this air opening, so that the air flow is reduced in the region of the cleaning tool.

Other vacuum cleaners have an electrical adjustment device, which changes the speed of the driving electric motor, and hence the speed of the suction fan, as a result of which the conveyed air volume, and consequently the suction power, are decreased.

Interruptions constantly occur when cleaning a room, due to having to move chairs, etc., or having to change cleaning tools. During these interruptions, the cleaning tool is put aside, and the device idles at high power, which is connected with an additional noise production.

It is therefore an object of the present invention to provide a vacuum cleaner, the suction or vacuum air flow (working air flow) of which is adjustable to a predetermined value and adapts to changing cleaning conditions, i.e. air flow resistances.

This object, and other objects and advantages of the present invention, will appear more clearly from the following specification in connection with the accompanying drawing, which shows one embodiment of the present invention, and in particular schematically illustrates the arrangement of units in the suction channel of a vacuum cleaner, as well as the inventive control and regulating circuit, with two timing circuits.

The vacuum cleaner of the present invention is characterized primarily in that the electrical output signal is conveyed to a regulating and control circuit which adjusts the working air flow to a predetermined value as a function of the output signal.

After switching on the device, the control and regulating circuit maintains a constant suction air flow during cleaning of different articles, so that the air passing through is extensively constant. A manual readjustment of the suction air flow is therefore eliminated. The strength of the suction air flow generated by the motor fan is adjusted in such a way that it is sufficient for all generally encountered cleaning work, and is kept substantially constant by the inventive control and regulating circuit during all cleaning procedures, whether cleaning largely air permeable curtains, or textile floor coverings where the suction air flow is greatly throttled. Even when the suction tool is lifted clear of the surface to be cleaned, for example during interruptions of the cleaning procedure, the conveyed air quantity remains constant, so that excessive noise generation is avoided from a motor which runs fast because of reduced air resistance.

The control signal of the generator, which occurs as a control voltage, can be changed by an external signal by means of a timing circuit provided in addition to the control and regulating circuit, so that for the closed control path, including the generator, direct current circuit, power circuit, electric motor, suction fan, and air turbine, a condition can be simulated which effects an intended increase or decrease of the motor speed, and hence an increase or reduction of the suction fan capacity.

According to further features of the present invention, the motor with the adjoining suction fan, the air flow measuring device, and the associated regulating and control circuit may form a closed control system. The regulating and control circuit keeps the working air flow constant. The air flow measuring device may be a generator driven by an air turbine with the output signal of the generator being conveyed as a control voltage to a power output control (the regulating and control circuit), which alters the speed or power of the electric motor or of the suction fan. The control voltage may be conveyed to the power output control via a transistorized circuit.

The power output control circuit may be a phase-gate control, the point of ignition of which is variable by the control voltage. The control voltage may be variable by means of a switching circuit which is started by an electrical pulse. This electrical pulse may be generated directly or indirectly by a manually actuatable push element. The electrical pulse may also be generated by a pressure-dependent switch which is arranged in the suction air flow. A blocking member or flap which is actuated mechanically, may be provided for interrupting the suction air flow. The control voltage of the generator may be conveyed to a switching circuit, with the drop or elimination of the control voltage, which arises upon interruption of the suction air flow, triggering an electrical pulse. The output voltage of the switching circuit may be superimposed over the control voltage in such a manner that by shifting the point of ignition of the power output control, the electric motor is brought to maximum power.

The output voltage of one of the switching circuits may be superimposed over the control voltage in such a manner that by shifting the point of ignition, the electrical power of the motor is brought to nearly zero. A respective switching circuit may remain in operation for a predetermined period of time. A pulse for starting a switching circuit may be emitted during the operation of the switching circuit, thus extending the operating time of the switching circuit. The ignition voltage at the ignition capacitor of the phase-gate control may be variable by an impedance which is regulated by the control voltage and is connected in parallel to the ignition capacitor.

Referring now to the drawing in detail, the embodiment illustrated shows the schematic arrangement of the units 3, 7, 11, 12 in the suction channel 8 of a not further illustrated vacuum cleaner, and also shows the inventive control and regulating circuit as functional groups 1 and 2.

Air is conveyed through the suction channel 8 in the direction of arrow 14 by a suction fan 12 which is driven by the motor 11. This working air flow of the suction fan 12 is provided as a suction or vacuum air flow for receiving and transporting dirt, which is picked up by a non-illustrated cleaning tool, and is deposited in a dust-collecting container upon passage of the working air flow through a non-illustrated filter device. The working air flow, after passing through the dust-collecting container and the suction fan 12, is again conveyed to the atmosphere.

An air turbine 3 is arranged in the suction channel 8 in the working air flow; this air turbine 3 is mounted on the shaft of a generator 7, which it drives. The air turbine 3 rotates in conformity to the air flow of the working air flow, so that the generator delivers a voltage proportional to the air flow at its output terminals. Either the entire working air flow or only a portion of the air flow passes through the air turbine 3.

The generator 7 is connected with the electric motor 11 by means of a direct current circuit 2 and a power circuit 1 (the aforementioned functional groups), so that a closed control system results comprising the air turbine 3, the generator 7, the direct current circuit 2, the power circuit 1, the electric motor 11, and the suction fan 12.

The power circuit 1 is located in the power supply line 15 of the electric motor 11 in series with a power switch 13.

The power circuit 1 operates according to the known principle of phase-gate control, and essentially comprises a triac 101, a diac 102, an ignition capacitor 103, and a charging resistor 104. The structural parts are connected in a known manner as a phase-gate control or phase-gate regulator. The triac 101 is located in the power supply line 15, and its control line is connected to the diac 102, which is connected by capacitor 103 with the power line 15. The charging resistor 104 is parallel to the triac 101 and the diac 102. Furthermore, the capacitor 103 is parallel to the control input 16.

The point of ignition of the triac 101 is reached within every half wave of the power voltage, when the voltage at the ignition capacitor 103 has reached the ignition threshold of the diac 102. The ignition capacitor 103 is charged by the charging resistor 104 in conformity to the particular polarity.

A direct current circuit 2 is connected to the control input 16 of the power circuit 1 in such a manner that the point of ignition of the phase gate can be shifted within a half wave by means of a direct voltage. The alternatingcurrent inputs of a rectifier 201 are connected in the direct current circuit to the control input 16, i.e., parallel to the ignition capacitor 103. The direct voltage outputs are bridged by a transistor 202. The transistor 202 is an npn transistor, the emitter of which is connected to the negative output of the rectifier, and the collector of which is connected to the positive output of the rectifier 201. The base of the transistor 202 is connected with the collector by a capacitor 203.

Furthermore, the base of the transistor 202 is connected with a resistor 204 and an amplifier transistor 205. The emitter of the amplifier transistor 205, a pnp-transistor, is connected to the collector of the transistor 202, with its collector being connected to the base of the transistor 202. A control voltage source, in the present embodiment the output terminals 18 of the generator 7, is connected between the base and emitter via a diode 206.

The combination of components of this direct current circuit 2 is designated as a voltage-dependent parallel impedance to the charging capacitor 103. Aside from a "soft-starting function", the shifting of the point of ignition is controllable by the voltage at the base of the transistor 205.

The control voltage 19 at the base of the transistor 205 can be influenced by timing circuits 4 or 6. These timing circuits are provided as a second voltage source for control of the direct current circuit 2, whereby the control voltage 17 can be superimposed either amplified (by timing circuit 4) or attenuated or reduced (by timing circuit 6) relative to the voltage 19 existing or applied at the output of the timing members.

The control voltage is applied to the base of the transistor 205 via a diode 401 or 601 so long as the transistor 402 or 602 is driven or excited. The polarity of the voltage of the timing circuit 4 opposes the control voltage of the generator 7, and consequently at least partially cancels the controlled effect thereof. The control voltage is accordingly reduced, so that the control and regulating circuit 1,2 increases the speed, and hence the capacity, of the suction fan. As a result, the suction capacity of the device can be increased to maximum capacity for a predetermined time.

A capacitor is connected in the timing circuit 4 to the base of the transistor 402 in such a manner that the capacitor can be charged to a negative polarity by means of an external contact, as a result of which the transistor 402 is driven and, after opening of the external contact, remains driven for the time predetermined by the capacitance of the capacitor 403 and its parallel discharging resistor 404. Consequently, the control and regulating circuit can be influenced in this arrangement by an electrical impulse in such a way that for a predetermined time the circuit can be controlled high to the maximum capacity of the suction fan.

The transistor 602 in the timing circuit 6 is driven by an external contact with a positive voltage, so that the capacitor 603 is charged with this voltage. Due to its capacitance, the capacitor 603 maintains the driven condition of the transistor 602 for a time which is determined by the discharging current through the base of the transistor 602. The voltage superimposed upon the control voltage via the base of the transistor 205 has the same polarity, so that the control voltage 19 is increased. Because of the increase, the control and regulating circuit 1,2 throttles the capacity of the motor, so that the capacity of the suction fan 12 is reduced to a minimum, preferably being returned to a zero value.

Different devices can be provided for starting the timing circuits.

A manually or foot-operated pushbutton switch 9 can be provided for starting the timing circuit 4; after operation of the switch 9, the control and regulating circuit 1,2 is operated at maximum capacity for a predetermined time prescribed by the capacitor 403 and the discharging resistor 404. It is likewise advantageous to arrange an underpressure switch 5 in the suction channel 8; after a predetermined underpressure has been reached in the suction channel 8, the switch 5 closes its contacts. This underpressure switch 5 closes as soon as the push or contact flap 10 is brought out of the illustrated position into a position represented by dot-dash lines before the suction opening of the suction channel 8. The push flap 10 is held open by, for example, a spring 20, namely in the illustrated full-line position.

Such an underpressure switch 5 can also be used to start the timing circuit 6. If the non-illustrated cleaning tool has suctioned itself securely to the surface to be cleaned, the resulting underpressure starts the timing circuit 6 and throttles the performance of the motor, whereby the suction capacity approaches zero. Consequently, an easy release or loosening of the cleaning tool from the surface to be cleaned is possible.

The timing circuits 4 and 6 can also be connected with the generator 7 by the dash-line connection 21, so that as a starting pulse of the timing circuit, the lack or absence of speed information from the generator 7 can be utilized. The lack of speed information represents standstill of the turbine 3, which can no longer rotate because of the lack of air flow. This start information for a timing circuit can also be produced by a push or contact flap 10 indirectly or without further signal lines.

Furthermore, it is possible to arrange the timing circuit 4 in double, and to equip it in such a manner that in place of the selective increasing and decreasing of the suction capacity, a timing circuit 4 or 6 is respectively associated with each of the signal sources 5 or 7 and each of the two possible functions.

The inventive vacuum cleaner with constant air flow operates as follows:

After closing the power switch 13, the power voltage is applied to the still blocked power circuit 1. The triac 101 is first ignited or turned on by the diac 102 when a voltage has built up on the capacitor 103 which corresponds to the ignition voltage of the diac 102. The capacitor 103 is charged via the resistor 104. The impedance (the direct current circuit 2), which is parallel to the capacitor, is however very low, because the transistor 202 is still fully driven and the capacitor 203 is not yet charged at the base of the transistor 202. The capacitor 203 is charged within approximately one second by the base current and in part via the resistor 204, and the transistor 202 is less driven. The impedance of the direct current circuit 2 increases, which makes it possible to charge the capacitor 103 to the ignition voltage of the diac 102. The ignition voltage is not reached until late in the particular half wave of the power voltage. This time point, however, is advanced by the proceeding charging progress in the direct current circuit 2, and the motor 11 drives the suction fan 12 with increasing speed. The motor-blower unit 11,12 accordingly starts up smoothly because of the charging progress of the capacitor in the direct current circuit 2.

The started suction fan 12 generates the desired air flow in the suction channel 8, and this air flow in turn drives the turbine 3. The voltage of the output signal at the generator 7 rises with increasing speed; this voltage is applied as a control voltage 17 to the direct current circuit 2. This control voltage 17 opposes a further advance of the point of ignition of the phase gate control.

While exciting the transistor 205 via the diode 206, and when the charging of the capacitor 203 does not proceed any further, the phase gate is not further displaced so that the electric motor 11 no longer changes its speed. The suction fan 12 now runs at a capacity prescribed by the electronic components of the direct current circuit 2.

If the cleaning tool is guided over the article (for instance a curtain) to be cleaned, the air flow decreases slightly because of the obstruction, the turbine 3 runs slower, and the output voltage of the generator 7 drops. Consequently, the direct voltage can increase further in the direct voltage circuit 2, and the point of ignition of the triac 101 is further advanced, so that the phase gate is shifted forwardly and the speed of the electric motor 11 and the suction fan 12 increase until the control circuit is again balanced.

When vacuuming an only slightly air permeable article, for example a short-fiber textile floor covering, the turbine 3 again runs more slowly as a result of the throttling of the air flow; the generator 7 delivers a smaller output voltage, so that the point of ignition of the triac 101 is again shifted so far forward until the required capacity of the electric motor 11, and hence of the suction fan 12, is attained. This effect occurs when, for example, during use of other cleaning tools or during exchange of suction channels, modified air through-passage cross sections are provided, or for structural reasons, to obtain higher air speeds, very small cross sections are provided in the air guide of the cleaning tool. The maximum, however, can only temporarily be slightly delayed and not completely obtained by means of the additive constants on the basis of the signal delay of the direct current circuit 2 and the power circuit 1. If, however, during a cleaning procedure the maximum value of power is desired, for example because a lot of dirt is to be removed, then, for example by actuating the flap 10 in the suction channel 8, the air flow is briefly nearly completely blocked. As a result of the underpressure developed in the suction channel 8, the underpressure switch 5 is closed when the underpressure falls below a fixed threshold value, whereby the timing circuit 4 starts as a result of this electrical pulse, whereby the capacitor 403, and hence the base of the transistor 402, have a low potential applied thereto. The transistor 402 is driven, and the transistor 205 is blocked by the diode 401, so that the capacitor 203 is further charged and the transistor 202 is blocked, whereby the direct current circuit 2 has an extremely high impedance, so that the ignition capacitor 103 can be charged very quickly, i.e., the point of ignition of the diac 102 can be attained very quickly. Consequently, substantially the full power voltage is applied to the motor 11, so that the motor 11 operates at its maximum power.

The push or contact flap 10 however is closed only briefly, and in the meantime is returned again to the starting position, for example by the spring 20. The underpressure in the suction channel 8 is reduced by the inflowing air, so that the underpressure switch 5 opens again. The capacitance of the capacitor 403, however, discharges only slowly, so that the described high-impedance condition of the direct-current circuit, and consequently the controlled maximum power, is maintained for a predetermined time. Thus, for example, the power circuit 1 is controlled at maximum power for thirty seconds. This power increase can be repeated as often as desired by pressing down the flap 10, whereby several pulses can be superimposed, so that the maximum power can be maintained over a longer time period. After expiration of the predetermined time, the electric motor 11 is returned to its lowest power when no further obstruction of the air flow exists. If the air flow, however, is restricted as a result of continued vacuuming, the suction capacity required at a particular time is automatically obtained.

Such a control and regulating circuit can advantageously be equipped with means for monitoring suctioning of a cleaning tool securely to a surface. Such monitoring operates for example as follows:

The control or regulating procedure occurs as already described up to the built-up or transient state of the control or regulating circuit. A maximum suction capacity of the suction fan 12 can be obtained in this embodiment for a predetermined time by means of the timing circuit 4 by manual actuation of the switch 9 (for example, foot actuation). The underpressure switch 5 is connected to the timing circuit 6 in conformity with the timing circuit 4, and the outputs of the circuit 6 are parallel to the outputs of the circuit 4. After the pressure falls below a fixed pressure, the underpressure switch 5 closes its contacts and starts the timing circuit 6, which for a short time, for example two seconds, switches the power circuit to minimum output or even to "off" via the direct current circuit.

Upon closing the underpressure switch 5, the capacitor 603, and hence the base of the transistor 602, have positive voltage applied thereto, so that the transistor 602 is driven. The transistor 205 is likewise driven by the diode 601, so that the capacitor 203 is short circuited and the transistor 202 is fully driven. The impedance of the direct current circuit 2 becomes extremely low, and the ignition voltage at the ignition capacitor 103 of the power circuit 1 cannot be attained at all, or only very slowly, so that the motor comes to a standstill or runs at minimum speed. If the undepressure in the suction channel 8 is reduced, the underpressure switch 5 opens again. The capacitor 603, however, maintains the described condition for a relatively short time (1 to 2 seconds). After discharge of the capacitor 603, the motor 11, and hence the suction fan 12, because of the developed direct current circuit 2, again start running gradually, as already described previously. In this manner it is for example possible to easily release a nozzle which has become securely suctioned to an article to be cleaned.

Naturally, also the absence of speed information of the generator 7 can be used for triggering the "securely suctioned monitoring" (timing circuit 6). The starting or output signal of the generator is evaluated by an electrical switch or circuitry not described in further detail, which upon the absence of speed information starts the timing circuit 6. The possibility of utilizing the speed information for starting a timing circuit is only indicated in the drawing by the two dash lines as the connection 21 from the generator 7 to the timing circuit 4 or 6.

During a suction cleaning procedure, which begins with placement of the operating surface of the cleaning tool on the surfaces to be cleaned, the suction air flow entering the cleaning tool experiences a throttling. This throttling effects an increase of the motor unit 11 and 12 to a higher power setting in order to maintain the suction air flow necessary for the cleaning. The higher power setting is maintained as long as the cleaning tool is moved over the surface to be cleaned and accordingly experiences a throttling. The power set at the motor-blower unit (electric motor 11 and suction fan 12) moves in a power range which is proportional to the throttling condition of the suction air flow.

If the cleaning effect is not sufficient in an especially dirty area, then in order to increase the suction air flow, the timing circuit 4, and the maximum power setting, by means of the manually actuatable element 9, 10 are triggered. Preferably the element 9, 10 is located in the region of the guide part grasped by the hand of an operator on the suction tube or hose. A shut-off pulse may be exerted upon the suction air flow by a push element 10, so that an underpressure switch 5, because of the underpressure which occurs, is actuated and thereby starts the timing circuit 4. Alternatively, the timing circuit may be started directly by an electrical pushbutton element 9. Such an element 9 can also be embodied as a foot switch. Since the highest power is necessary only briefly, namely only to clean an especially stubborn dirty spot, for example in the entry region of a room having a textile floor covering, the device is embodied in such a way that the regulating and control circuit 2,1 returns the motor-blower unit to the normal cleaning setting, for example after approximately 30 seconds, whereby the cleaning setting automatically adjusts itself according to the extent of the throttling of the suction air flow.

If the cleaning tool is laid aside during the cleaning or after an intensive cleaning procedure in such a manner that the suction air flow entering the cleaning tool no longer experiences any throttling, then the control and regulating system controls or reduces the motor suction fan speed to the low speed range. This eliminates having to turn the vacuum cleaner off and then on again, for example during interruptions of the cleaning operation, since the device is automatically reduced to a low speed, at which speed additionally little noise is produced. An adjustment or setting of the desired suction capacity or power is likewise eliminated, since the throttling of the suction air flow associated with continuation of cleaning right away adjusts the motor fan to an appropriate power.

The suction air flow remains constant in spite of all changes in the flow resistance. This is the case even when, as a result of the dust collected, the non-illustrated filter device is gradually clogged up and accordingly the flow resistance increases in the path of the suction channel.

The starting of the timing circuit 4, which effects the maximum power delivery of the suction fan 12, can be repeated as often as desired, whereby by renewed starting of the timing circuit within a time period, the timing circuit starts anew, so that the maximum power can be maintained as long as desired.

By means of the timing circuit 6, which advantageously is superimposed over the outputs of the timing circuit 4 and consequently can likewise effect an influencing of the control voltage 19, the motor can be brought to a near zero power setting. It is accordingly possible to release a nozzle which may have become securely suctioned to the articles to be cleaned. The timing circuit 6 can also be started when for example the timing circuit 4 is running, so that the control order or instruction "maximum power" is superimposed by the control instruction "reduce to zero" with the control instruction "reduce to zero" taking precedence.

The present invention is, of course, in no way restricted to the specific disclosure of the specification and drawing, but also encompasses any modifications within the scope of the appended claims.

What we claim is:

1. A vacuum cleaner with constant air flow for home and industry, comprising:
    a suction channel for suction air flow;
    a suction fan mounted in said channel for generating a working air flow in the form of said suction air flow;
    an electric motor for driving said suction fan;
    an air-flow measuring device arranged in said suction channel in said suction air flow, said air-flow measuring device generating an electrical output signal which is proportional to said suction air flow;
    a regulating and control circuit associated with said electric signal generating device in the suction channel for receiving said electrical output signal and for adjusting motor speed as to suction fan capacity of said suction air flow to a predetermined value as a function of said signal, said electric motor, with its adjoining suction fan, said air-flow measuring device, and said associated regulating and control circuit forming a closed control system, said regulating and control circuit being embodied in such a way relative to the electric signal generating device so as to keep said suction fan capacity of said suction air flow constant, said air-flow measuring device including an air turbine, and a generator which is driven by said air turbine and generates said electrical output signal, which is conveyed as a control voltage to said regulating and control circuit, and in response to which said circuit alters the speed of said electric motor and said suction fan.

2. A vacuum cleaner according to claim 1 in which said regulating and control circuit comprises a transistorized circuit and a power output control circuit, said control voltage being conveyed to said power output control circuit via said transistorized circuit.

3. A vacuum cleaner according to claim 2, in which said power output control circuit is a phase-gate control, the point of ignition of which is changeable by said control voltage.

4. A vacuum cleaner according to claim 3, which includes a switching circuit connected to said transistorized circuit for changing said control voltage, said switching circuit being started by an electrical pulse.

5. A vacuum cleaner according to claim 4, which includes a manually actuatable element operable to interrupt flow through said suction channel for directly or indirectly generating said electrical pulse.

6. A vacuum cleaner according to claim 4, which includes a pressure-dependent switch arranged in said suction air flow of said suction channel for generating said electrical pulse.

7. A vacuum cleaner according to claim 6, which includes a mechanically actuatable blocking member mounted in said suction channel for interrupting said suction air flow and bringing about a drop in said control voltage.

8. A vacuum cleaner according to claim 7, in which said control voltage of said generator is conveyed to said switching circuit, said drop in said control voltage triggering an electrical pulse.

9. A vacuum cleaner according to claim 8, in which the output voltage of said switching circuit is superimposed over said control voltage in such a way that a shift of the point of ignition of said power output control circuit brings said electric motor to maximum power.

10. A vacuum cleaner according to claim 9, which includes a respective first and second switching circuit maintained selectively operative temporarily for a predetermined period of time.

11. A vacuum cleaner according to claim 8, in which said switching circuit includes a first switching circuit and a second switching circuit, the output voltage of said second switching circuit being superimposed over said control voltage in such a way that a shift of the point of ignition of said power output control circuit brings the power of said electric motor to nearly zero.

12. A vacuum cleaner according to claim 11, which includes a respective first and second switching circuit maintained selectively operative temporarily for a predetermined period of time.

13. A vacuum cleaner according to claim 12, in which the operating time of a given switching circuit is extendable by a pulse which starts said switching circuit and is emitted during operation thereof.

14. A vacuum cleaner according to claim 13, in which said phase-gate control circuit includes an ignition capacitor, with the ignition voltage at said ignition capacitor being varied by an impedance which is regulated by said control voltage and is connected in parallel to said ignition capacitor.

* * * * *